(12) United States Patent
Hu

(10) Patent No.: US 12,526,674 B2
(45) Date of Patent: Jan. 13, 2026

(54) MEASUREMENT CONFIGURATION METHOD, DEVICE AND STORAGE MEDIUM

(71) Applicant: GUANGDONG OPPO MOBILE TELECOMMUNICATIONS CORP., LTD., Guangdong (CN)

(72) Inventor: Rongyi Hu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 552 days.

(21) Appl. No.: 17/971,432

(22) Filed: Oct. 21, 2022

(65) Prior Publication Data

US 2023/0046505 A1 Feb. 16, 2023

Related U.S. Application Data

(63) Continuation of application No. PCT/CN2020/085846, filed on Apr. 21, 2020.

(51) Int. Cl.
*H04W 24/10* (2009.01)
*H04W 56/00* (2009.01)

(52) U.S. Cl.
CPC ......... *H04W 24/10* (2013.01); *H04W 56/001* (2013.01)

(58) Field of Classification Search
CPC ................ H04L 12/28; H04L 12/50
(Continued)

(56) References Cited

U.S. PATENT DOCUMENTS 11,672,019 B2 * 6/2023 Zhou .................. H04W 52/50
370/329
2015/0245235 A1 8/2015 Tang et al.
(Continued)

FOREIGN PATENT DOCUMENTS

CN 108200593 A 6/2018
CN 108810955 A 11/2018
(Continued)

OTHER PUBLICATIONS

WO/2020/015563, Liang et al. ( See translation,), Jul. 10, 2019, pp. 1-120.*
(Continued)

*Primary Examiner* — Dang T Ton
(74) *Attorney, Agent, or Firm* — Ladas & Parry, LLP

(57) ABSTRACT

A measurement configuration method, a device and a storage medium are used for resolving a problem of being unable to be covered by an MG of an existing mechanism caused by a flexible MO SMTC configuration. The method includes: a network device generates measurement configuration information for indicating a plurality of MGs (101) and transmits the measurement configuration information to a terminal device (102); and the terminal device performs a measurement according to the measurement configuration information (103), where the plurality of MGs can be a same type of MGs or different types of MGs, and measurement gaps of the plurality of MGs can cover at least one SMTC of at least one MO. By adding an MG configuration, a purpose of covering more SMTCs is achieved, and a delay problem in measurement and reporting of a terminal can be effectively reduced.

17 Claims, 9 Drawing Sheets

(58) Field of Classification Search
USPC .................................. 370/329, 401, 402, 403
See application file for complete search history.

(56) References Cited

U.S. PATENT DOCUMENTS

| | | | |
|---|---|---|---|
| 2015/0327104 A1 | 11/2015 | Yiu et al. | |
| 2016/0157218 A1* | 6/2016 | Nam | H04B 7/0632 370/329 |
| 2018/0021017 A1 | 1/2018 | Wang et al. | |
| 2018/0255472 A1 | 9/2018 | Chendamarai Kannan et al. | |
| 2019/0306734 A1 | 10/2019 | Huang et al. | |
| 2019/0342801 A1 | 11/2019 | Cui et al. | |
| 2019/0373498 A1 | 12/2019 | Yiu et al. | |

FOREIGN PATENT DOCUMENTS

| | | | |
|---|---|---|---|
| CN | 109803303 A | 5/2019 | |
| CN | 110352609 A | 10/2019 | |
| CN | 110557976 A | 12/2019 | |
| CN | 110740050 A | 1/2020 | |
| CN | 110856200 A | 2/2020 | |
| CN | 110870349 A | 3/2020 | |
| WO | WO-2020015563 A1 * | 1/2020 | ............ H04W 24/08 |
| WO | 2020060951 A1 | 3/2020 | |

OTHER PUBLICATIONS

Huawei, HiSilicon, "Discussion on mandatory gap pattern in R-16", R4-2001665, 3GPP TSG-RAN WG4 Meeting #94-e, Online, Feb. 24-Mar. 6, 2020.

The first Office Action and search report of corresponding Chinese application No. 202310170981.3, dated Jul. 24, 2024.
The Summons to attend oral proceedings of corresponding European application No. 20931985.4, dated Aug. 26, 2024.
The first Office Action of corresponding European application No. 20931985.4, dated Feb. 19, 2024.
International Search Report (ISR) dated Jan. 21, 2021 for Application No. PCT/CN2020/085846, and its English translation provided by WIPO.
Written Opinion (WOSA) dated Jan. 21, 2021 for Application No. PCT/CN2020/085846, and its English translation provided by WIPO.
3GPP TS 38.331 V17.2.0 (Sep. 2022), 3rd Generation Partnership Project;Technical Specification Group Radio Access Network; NR; Radio Resource Control (RRC) protocol specification (Release 17).
3GPP TS 38.133 V17.7.0 (Sep. 2022), 3rd Generation Partnership Project; Technical Specification Group Radio Access Network; NR; Requirements for support of radio resource management (Release 17), pp. 82-962.
The Extended European Search Report of corresponding European application No. 20931985.4, dated May 2, 2023.
Intel Corporation, "Motivation to introduce new SI of measurement gap enhancement", RP-191023, 3GPP TSG RAN Meeting #84, Newport Beach California, US, Jun. 3-6, 2019, all pages.
The second Office Action and search report of corresponding Chinese patent application No. 202310170981.3, dated Nov. 30, 2024.
The Decision to refuse of corresponding European patent application No. 20931985.4, dated Feb. 28, 2025.
The Brief communication of corresponding European patent application No. 20931985.4, dated Jan. 20, 2025.

* cited by examiner

MEASUREMENT CONFIGURATION METHOD, DEVICE AND STORAGE MEDIUM

CROSS-REFERENCE TO RELATED APPLICATIONS

This application is a continuation of International Application No. PCT/CN2020/085846, filed on Apr. 21, 2020, the content of which is hereby incorporated by reference in its entirety.

TECHNICAL FIELD

Embodiments of the present application relate to the technical field of communications, and in particular, to a measurement configuration method, a device and a storage medium.

BACKGROUND

In a new radio (NR) communication system, a network may configure a terminal in measuring receiving power and receiving quality of a reference signal, a signal to noise and interference ratio of a target neighbouring cell in an intra-frequency, an inter-frequency or a heterogeneous network in a specific time window. The specific time window is a measurement gap (MG).

In addition to below 6 GHz, a millimeter-wave frequency band above 6 GHz is also introduced in an operating frequency range of an NR terminal. Therefore, according to a capability of whether a terminal supports a frequency range of FR1/FR2, an MG is divided into the following three classes: gapFR1 (an MG applicable to FR1), gapFR2 (an MG applicable to FR2) and gapUE (an MG applicable to all frequency bands).

In a current protocol, only one type of MG can be configured by the network, but a single MG cannot cover a plurality of synchronization signal block measurement timing configuration (SSB measurement timing configuration, SMTC) information of different measurement objects (MOs) or two SMTCs (SMTC1 and SMTC2 as shown in FIG. 1) of the same MO, resulting in measurement and reporting delays.

SUMMARY

Embodiments of the present application provide a measurement configuration method, a device and a storage medium, so as to reduce a delay problem in measurement and reporting of a terminal.

According to a first aspect, an embodiment of the present application provides a measurement configuration method, including:
receiving, by a terminal device, measurement configuration information from a network device, where the measurement configuration information is used for indicating configuration information about a plurality of measurement gaps (MGs); and
performing, by the terminal device, a measurement according to the measurement configuration information.

According to a second aspect, an embodiment of the present application provides a measurement configuration method, including:
receiving, by a terminal device, measurement configuration information from a network device, where the measurement configuration information is used for indicating a measurement gap (MG) of a same type of measurement objects (MOs), and the MG of the same type of MOs is an MG additionally configured by the network device for the terminal device; and
performing, by the terminal device, a measurement according to the measurement configuration information.

According to a third aspect, an embodiment of the present application provides a measurement configuration method, including:
generating, by a network device, measurement configuration information, where the measurement configuration information is used for indicating configuration information about a plurality of measurement gaps (MGs); and
transmitting, by the network device, the measurement configuration information to a terminal device.

According to a fourth aspect, an embodiment of the present application provides a measurement configuration method, including:
generating, by a network device, measurement configuration information, where the measurement configuration information is used for indicating a measurement gap (MG) of a same type of measurement objects (MOs), and the MG of the same type of MOs is an MG additionally configured by the network device for a terminal device; and
transmitting, by the network device, the measurement configuration information to the terminal device.

According to a fifth aspect, an embodiment of the present application provides a terminal device, including:
a receiving module, configured to receive measurement configuration information from a network device, where the measurement configuration information is used for indicating configuration information about a plurality of measurement gaps (MGs); and
a processing module, configured to perform a measurement according to the measurement configuration information.

According to a sixth aspect, an embodiment of the present application provides a terminal device, including:
a receiving module, configured to receive measurement configuration information from a network device, where the measurement configuration information is used for indicating a measurement gap (MG) of a same type of measurement objects (MOs), and the MG of the same type of MOs is an MG additionally configured by the network device for the terminal device; and
a processing module, configured to perform a measurement according to the measurement configuration information.

According to a seventh aspect, an embodiment of the present application provides a network device, including:
a processing module, configured to generate measurement configuration information, where the measurement configuration information is used for indicating configuration information about a plurality of measurement gaps (MGs); and
a transmitting module, configured to transmit the measurement configuration information to a terminal device.

According to an eighth aspect, an embodiment of the present application provides a network device, including:
a processing module, configured to generate measurement configuration information, where the measurement configuration information is used for indicating a measurement gap (MG) of a same type of measurement objects (MOs), and the MG of the same type of MOs is an MG additionally configured by the network device for a terminal device; and a transmitting module, configured to transmit the measurement configuration information to the terminal device.

According to a ninth aspect, an embodiment of the present application provides a terminal device, including a memory and a processor, where the memory is configured to store a computer program, and the processor is configured to invoke and run the computer program stored in the memory, so that the processor is caused to run the computer program to execute the method according to any one of the first aspect or any one of the second aspect.

According to a tenth aspect, an embodiment of the present application provides a network device, including a memory and a processor, where the memory is configured to store a computer program, and the processor is configured to invoke and run the computer program stored in the memory, so that the processor is caused to run the computer program to execute the method according to any one the third aspect or any one of the fourth aspect.

According to an eleventh aspect, an embodiment of the present application provides a storage medium, including a computer program which is configured to implement the method according to any one of the first aspect or any one of the second aspect.

According to a twelfth aspect, an embodiment of provides a storage medium, including a computer program which is configured to implement the method according to any one of the third aspect or any one of the fourth aspect.

According to a thirteenth aspect, an embodiment of provides a communication system, including:

a terminal device and a network device, and the terminal device is in communication connection with the network device;

where the terminal device is a terminal device according to the fifth aspect, and the network device is a network device according to the seventh aspect; or, the terminal device is a terminal device according to the sixth aspect, and the network device is a network device according to the eighth aspect.

Embodiments of the present application provide a measurement configuration method, a device, and a storage medium, which are used for solving a problem of being unable to be covered by an MG of an existing mechanism caused by a flexible MO SMTC configuration. The method includes: a network device generating measurement configuration information for indicating a plurality of MGs, and transmitting the measurement configuration information to a terminal device; and the terminal device executes a measurement based on the measurement configuration information, where the plurality of MGs can be the same type of MGs or different types of MGs, and measurement gaps of the plurality of MGs can cover at least one SMTC of at least one MO. By adding an MG configuration, a purpose of covering more SMTCs is achieved, and a delay problem in measurement and reporting of the terminal can be effectively reduced.

DESCRIPTION OF EMBODIMENTS

To make objectives, technical solutions, and advantages of the present application clearer, the following clearly and completely describes the technical solutions in embodiments of the present application with reference to accompanying drawings in the embodiments of the present application. Apparently, the embodiments to be described are merely a part rather than all of the embodiments of the present application. Other embodiments obtained by a person of ordinary skill in the art based on the embodiments of the present application without creative efforts shall belong to the protection scope of the present application.

The terms "including", "having" and any variation thereof in the description, claims and drawings of the embodiments of the present application, are intended to cover a non-exclusive inclusion, such as a process, a method, a system, a product or a device which includes a series of steps or units, is not necessarily limited to those expressly listed steps or units, and may include other steps or units which are not expressly listed or inherent to the process, the method, the product, or the device.

In order to better understand the measurement configuration method provided by the embodiments of the present application, a communication system architecture involved in the embodiments of the present application is described below.

Figure 1:
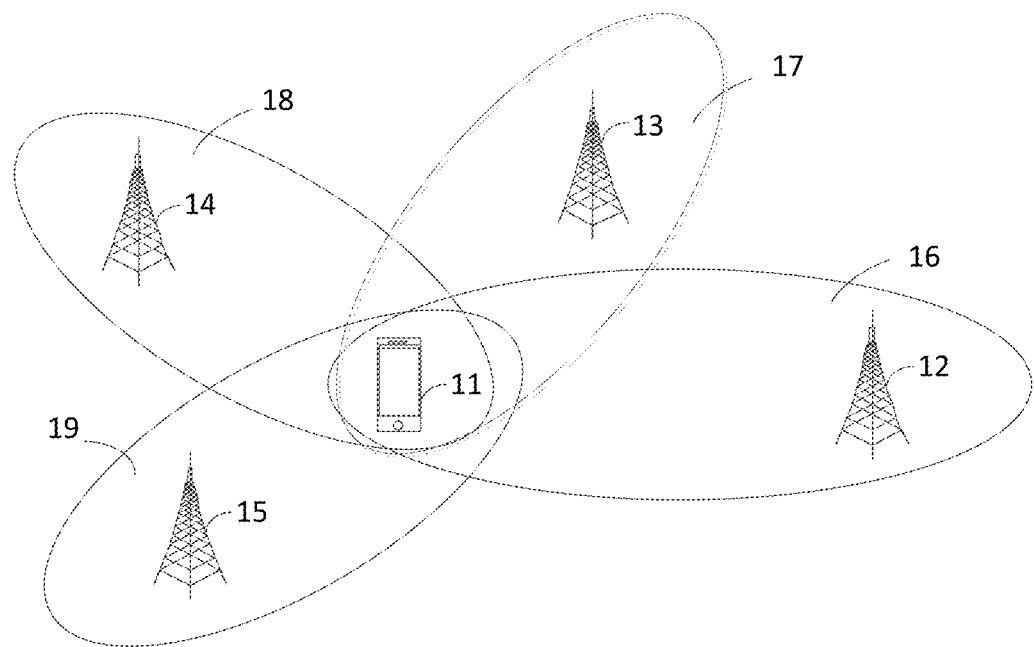
FIG. 1 is a schematic diagram of a wireless communication system provided by an embodiment of the present application.

FIG. 1 is a schematic diagram of a wireless communication system provided by an embodiment of the present application. As shown in FIG. 1, the wireless communication system may include one or more terminal devices (a terminal device 11 shown in FIG. 1) and a plurality of network devices (base stations 12, 13, 14, 15 shown in FIG. 1). The terminal device 11 is connected to a base station 12, for example, by using a radio resource control (RRC) connection, and a cell where the base station 12 is located is a serving cell 16 of the terminal device 11. The terminal device 11 may also be within a coverage area of a group of neighbouring cells 17 to 19 in which base stations 13 to 15 are located.

The terminal device provided in the embodiments of the present application may be a wireless terminal, and may also be a wired terminal. The wireless terminal may refer to a device providing data connectivity of voice and/or other services for a user, a handheld device having a wireless connection function, or other processing devices connected to a wireless modem. The wireless terminal may communicate with one or more core networks via a radio access network (RAN), and the wireless terminal may be a mobile terminal, such as a mobile phone (or referred to as a "cellular" phone) and a computer having the mobile terminal, for example, may be a mobile apparatus which is portable, pocket-sized, handheld, computer built-in, or vehicle-mounted, and may exchange language and/or data with the radio access network, for example, may be a personal communication service (PCS) phone, a cordless phone, a session initiation protocol (SIP) phone, a wireless local loop (WLL) station, a personal digital assistant (PDA), etc. The wireless terminal may also be referred to as a system, a subscriber unit, a subscriber station, a mobile station, a mobile, a remote station, a remote terminal, an access terminal, a user terminal, a user agent, and a user device (or User Equipment), which is not limited herein.

The network device provided by the embodiments of the present application is a device deployed in the radio access network to provide a wireless communication function, may be a base transceiver station (BTS) in global system of mobile communication (GSM) or code division multiple access (CDMA), may also be a base station (NodeB, NB) in wideband code division multiple access (WCDMA), may also be an evolutional Node B (eNB or eNodeB), a relay station or an access point in an LTE, or, a transmission reception point (TRP) or a next generation node B (gNB) in a new radio network, or a base station in another future network system, which is not limited herein.

The wireless communication system provided in the embodiments of the present application may be a communication system based on NR technologies, for example, a fifth generation mobile network (5th generation mobile networks, 5G) communication system or an NR-light system. It can also be applied to other communication systems, as long as there is an entity in the communication systems which needs to be instructed to communicate with another entity, and the another entity needs to perform a measurement by reading a measurement information configuration. For example, it can be applied to a case where the measurement information configuration needs to be performed between a network device and a terminal device, or two terminal devices, one of which takes on a function of accessing a network, etc. Specifically, the communication system may be, for example, a global system of mobile communication (GSM), a code division multiple access (CDMA) system, a wideband code division multiple access (WCDMA) system, a general packet radio service (GPRS) system, a long term evolution (LTE) system, a long term evolution-advanced (LTE-Advanced, LTE-A) system, an LTE frequency division duplex (FDD) system, an LTE time division duplex (TDD) system, a universal mobile telecommunication system (UMTS), etc.

Based on a measurement configuration received from the serving cell, a terminal device executes a measurement process to measure the serving cell and the neighbouring cells, and transmits a measurement report to a network device (such as the base station 12 in FIG. 1). For example, the network device transmits the measurement configuration to the terminal device through radio resource control (RRC) signaling, and the measurement configuration includes a measurement gap (MG) configuration and a measurement object (MO) configuration. The terminal device may perform the foregoing measurement process based on a reference signal transmitted by the network device, where the reference signal may be a synchronization signal block (SSB or SS/PBCH block) or a channel state information-reference signal (CSI-RS). The synchronization signal block may also be referred to as a synchronization signal/a physical broadcast channel (synchronization signal/physical broadcast channel, PBCH), may include one or more of a PBCH, a primary synchronization signal (PSS), and a secondary synchronization signal (SSS).

As an example, the serving cell 16 and a neighbouring cell 17 shown in FIG. 1 are intra-frequency cells, the serving cell 16 and a neighbouring cell 18 are inter-frequency cells, the serving cell 16 and a neighbouring cell 19 are cells in a heterogeneous network, that is, the serving cell 16 and the neighbouring cell 17 operate on the same carrier frequency, the serving cell 16 and the neighbouring cell 18 may not operate on the same carrier frequency, and the serving cell 16 and the neighbouring cell 19 use different radio access technologies (RATs). A measurement of the terminal device 11 includes an intra-frequency measurement (or referred to as a same frequency measurement) on the serving cell 16 and the neighbouring cell 17, an inter-frequency measurement (or referred to as a different frequency measurement) on the neighbouring cell 18, and an inter-RAT frequency measurement on the neighbouring cell 19. The intra-frequency measurement refers to that a cell where the terminal device is currently located and a target cell to be measured are on the same carrier frequency (a central frequency), and the inter-frequency measurement refers to that the cell where the terminal device is currently located and the target cell are not on the same carrier frequency. If the terminal device needs to perform the inter-frequency measurement (including an inter-system measurement), two radio frequency receivers may be installed in the terminal device to respectively measure a frequency point of the present cell and a frequency point of the target cell, but this would bring about a problem of increased costs and mutual interference between different frequency points. Therefore, 3GPP proposes a measurement gap, that is, a period of time is reserved, and during this period of time, a UE does not transmit and receive any data, instead, a receiver is tuned to the frequency point of the target cell for inter-frequency measurement, and when time of the measurement gap ends, the UE is switched to a current cell.

In an NR system, in addition to below 6 GHz, a millimeter-wave frequency band above 6 GHz is also introduced in an operating frequency range of the terminal device. Therefore, according to a capability of whether the terminal device supports a frequency range of FR1/FR2, RAN4 defines a measurement gap per UE and per FR, that is, gapFR1, gapFR2, and gapUE. Correspondingly, an independent measurement gap configuration (independent GapConfig) is also introduced for the terminal device, and the independentGapConfig is used for indicating whether the terminal device can configure a measurement gap per FR1/2.

The gapFR1: this measurement gap configuration is only applicable to FR1. Simultaneous configuration of the gapFR1 and the gapUE is not supported. In addition, in an EN-DC mode, the gapFR1 does not support an NR RRC configuration, and only LTE RRC can configure the gapFR1.

The gapFR2: this measurement gap configuration is only applicable to FR2. Simultaneous configuration of the gapFR2 and gapUE is not supported.

The gapUE: this measurement gap configuration is applicable to all frequency bands, including FR1 and FR2. In the EN-DC mode, only the LTE RRC can configure the gapUE, and the NR RRC configuration is not supported. If the gapUE is configured, the gapFR1 or the gapFR2 cannot be configured any more.

For a gap per-UE, the terminal device is not allowed to transmit any data, and the terminal device is not expected to adjust receivers of a primary carrier and a secondary carrier. If the terminal device supports the independent gap capability, that is, measurements of FR1 and FR2 may be independent without being affected, then the terminal device may configure a measurement gap per-FR.

In the embodiment of the present application, a parameter configuration of the measurement gap includes a measurement gap length (MGL), a measurement gap repetition period (MGRP), a measurement gap offset, a measurement gap timing advance (MGTA), where the MGL can be 1.5 ms, 3 ms, 3.5 ms, 4 ms, 5.5 ms, 6 ms; the MGRP can be 20 ms, 40 ms, 80 ms, 160 ms; and the MGTA can be 0ms, 0.25 ms (FR2), 0.5 ms (FR1). An offset of the MG may be any value in a set of $\{0, 1, \ldots, \text{MGRP-1}\}$, where a unit of a numerical value in the set 0 is millisecond (ms).

The terminal device may determine a starting position of the measurement gap according to the following formula:

SFN mod $T$=FLOOR(gapOffset/10);
subframe=gapOffset mod 10; with $T$=MGRP/10, where SFN represents a number of a system frame, mod represents a modulo function, and subframe represents a serial number of a subframe.

A current protocol supports 24 gap patterns, as shown in Table 1.

TABLE 1

| Gap pattern ID | MGL (ms) | MGRP (ms) |
| --- | --- | --- |
| 0 | 6 | 40 |
| 1 | 6 | 80 |
| 2 | 3 | 40 |
| 3 | 3 | 80 |
| 4 | 6 | 20 |
| 5 | 6 | 160 |
| 6 | 4 | 20 |
| 7 | 4 | 40 |
| 8 | 4 | 80 |
| 9 | 4 | 160 |
| 10 | 3 | 20 |
| 11 | 3 | 160 |
| 12 | 5.5 | 20 |
| 13 | 5.5 | 40 |
| 14 | 5.5 | 80 |
| 15 | 5.5 | 160 |
| 16 | 3.5 | 20 |
| 17 | 3.5 | 40 |
| 18 | 3.5 | 80 |
| 19 | 3.5 | 160 |
| 20 | 1.5 | 20 |

TABLE 1-continued

| Gap pattern ID | MGL (ms) | MGRP (ms) |
| --- | --- | --- |
| 21 | 1.5 | 40 |
| 22 | 1.5 | 80 |
| 23 | 1.5 | 160 |

The MO in the measurement configuration includes an intra-frequency MO, an inter-frequency MO, or a heterogeneous MO. The measurement configuration may specify a set of parameters to be measured corresponding to the MO. For example, the parameters to be measured include a reference signal received power (RSRP), a reference signal received quality (RSRQ), a signal-to-noise and interference ratio (SINR), a reference signal time difference (RSTD), etc.

In the NR system, the network device may configure an SMTC for the terminal device, and the SMTC is used for indicating information about measurement of an SSB for the terminal device. The SMTC includes one or more of a period of the SMTC, a duration (or referred to as a window length) of the SMTC, and a time offset of the SMTC. The period of the SMTC may be 5 ms, 10 ms, 20 ms, 40 ms, 80 ms, 160 ms. The length of the SMTC may also be referred to as a duration of the SMTC, and may be 1 ms, 2 ms, 3 ms, 4 ms, 5 ms. The time offset of the SMTC may be any value in the set of $\{0, 1, \ldots, \text{the period of the SMTC-1}\}$, and a unit of a numerical value in the set $\{\ \}$ is millisecond (ms).

The terminal device may determine a starting position of the SMTC according to the following formula:

SFN mod $T$=(FLOOR (Offset/10)); if the period of the SMTC is greater than sf5: subframe=Offset mod 10; otherwise, subframe=Offset or (Offset+5); with $T$=CEIL (Periodicity/10), where SFN represents a number of a system frame, FLOOR represents rounding down, subframe represents a serial number of a sub-frame, CEIL represents a rounding function, and Periodicity represents a period of the SMTC.

For an intra-frequency measurement in a connected state, two SMTCs (SMTC1 and SMTC2) may be configured for one intra-frequency MO, and the two SMTCs may have the same time offset but different periods (for example, a period of the SMTC2 is shorter than a period of the SMTC1). Only one SMTC (SMTC1) is configured for the inter-frequency measurement.

At present, the network device can only configure one type of measurement gap mentioned above, for example, a per-UE MG or a per-FR MG is configured. The MG configuration can support a measurement gap length mg1 {ms1dot5, ms3, ms3dot5, ms4, ms5dot5, ms6}, and a measurement gap period mgrp {ms20, ms40, ms80, ms160}. However, the SMTC configuration may support an SMTC length of {1 ms, 2 ms, 3 ms, 4 ms, 5 ms}, and an SMTC period of {5 ms, 10 ms, 20 ms, 40 ms, 80 ms, 160 ms}, resulting in that an MG cannot cover multiple SMTCs of multiple MOs, even two SMTCs of one intra-frequency MO.

Figure 2:
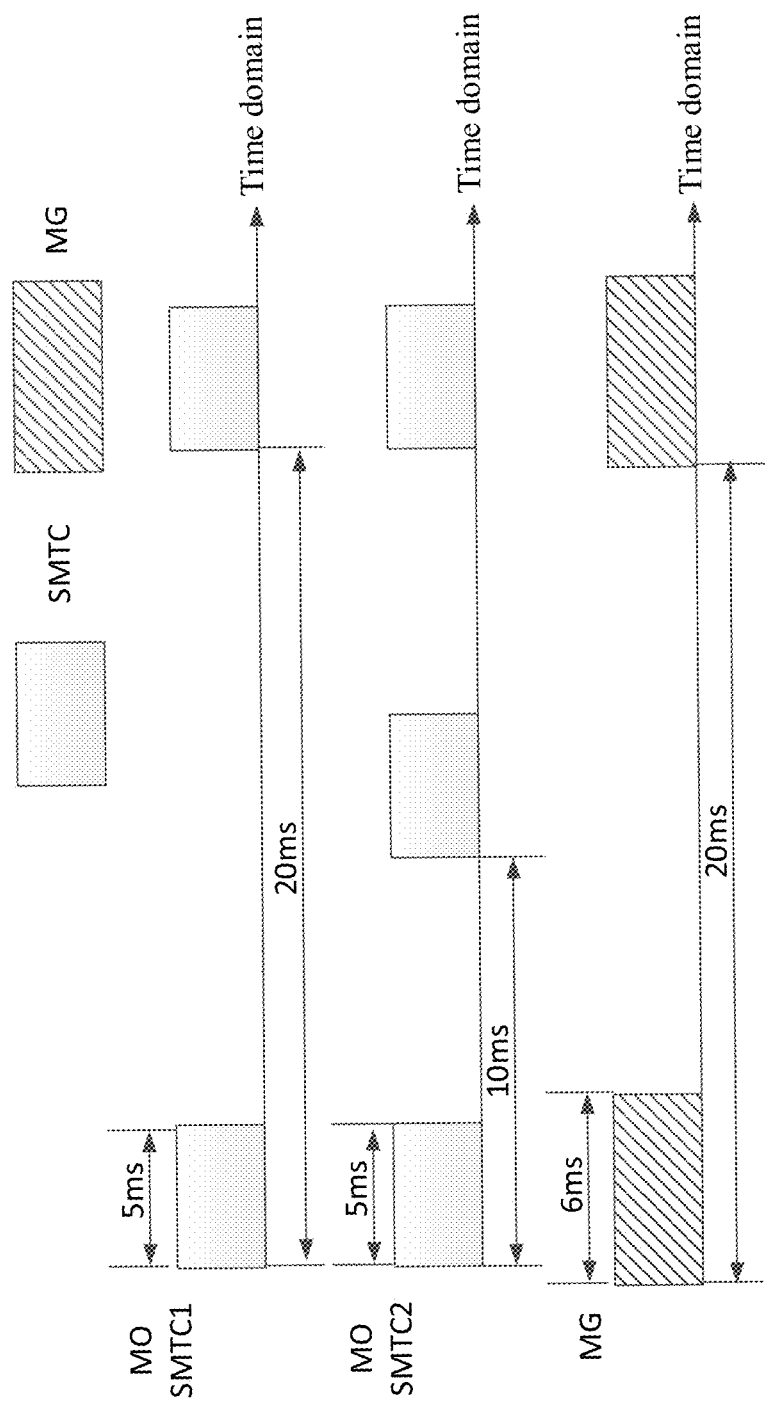
FIG. 2 is a schematic configuration diagram of a measurement gap and two SMTCs of a measurement object provided by an embodiment of the present application.

As an example, FIG. 2 shows a schematic configuration diagram of an MG and two SMTCs of an MO. As shown in FIG. 2, a network configures two SMTCs (SMTC1 and SMTC2 respectively) for the same MO, offsets and lengths of the two SMTCs are the same, for example, 5 ms. A period of the SMTC1 is 20 ms, and a period of the SMTC2 is 10 ms. The network configures a period of the MG to be 20 ms, and the length of the MG to be 6 ms. It can be seen from FIG. 2 that a measurement gap cannot cover a part SMTC of the SMTC2 of the MO.

As another example, if multiple MOs are configured with different SMTC offsets, the terminal device would not be able to process multiple SMTCs of different MOs on a single configured MG (a series of measurement periods). Therefore, the above configuration would lead to delay in measurement and reporting of the terminal device.

In order to solve the described problem, the embodiments of the present application provide a measurement configuration method. The network device and the terminal device in the method can support multiple MG configurations, and a problem that an MO SMTC cannot be covered by an MG of an existing mechanism is solved by addition of an MG configuration, so that the network device can perform a measurement configuration more flexibly and quickly for the terminal device, thus reducing the delay in the measurement and reporting of the terminal device. In a specific implementation, a new UE capability can be introduced, so that the UE can support MGs per UE and per FR at the same time. A new UE capability can also be introduced, so that the UE can support a plurality of MGs (the plurality of MGs can be the same type of MGs) at the same time. A new MG type can also be introduced, so as to support MGs per cell/CG (namely, MGs applicable to the same cell or the same cell group). The network device flexibly configures the MG to cover more SMTCs through any one of the foregoing implementations, thereby reducing a delay problem in measurement and reporting of the terminal.

The technical solutions of the present disclosure will be described below in detail with reference to several embodiments in conjunction with the accompanying drawings. The following specific embodiments may be combined with each other, and the same or similar concepts or processes will not be repeated in certain embodiments.

Figure 3:
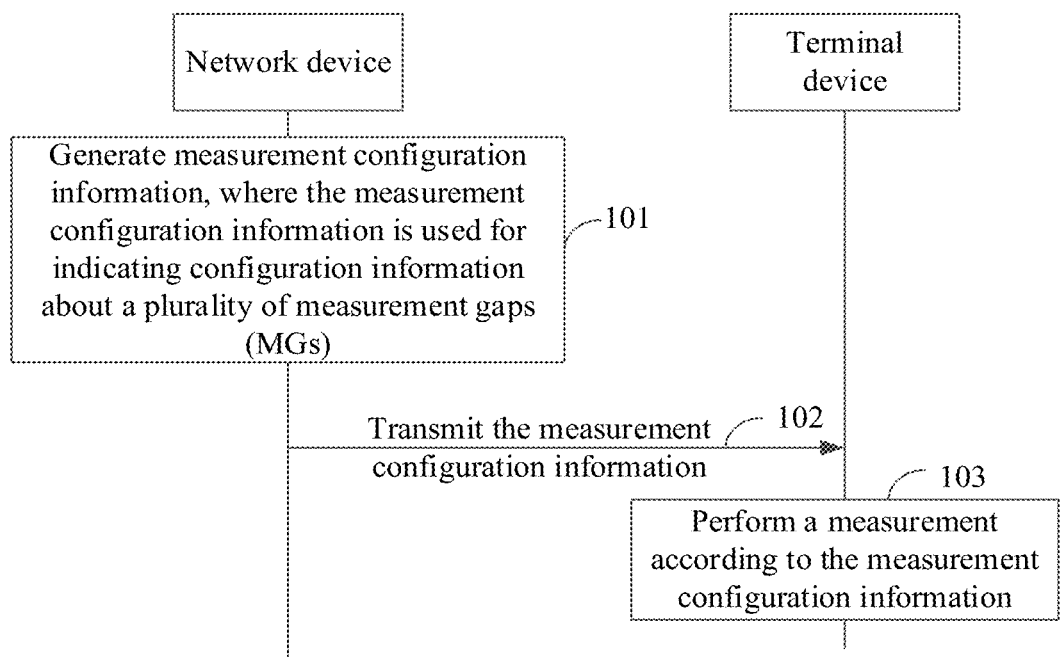
FIG. 3 is an interaction diagram of a measurement configuration method provided by an embodiment of the present application.

FIG. 3 is an interaction diagram of a measurement configuration method provided by an embodiment of the present application. As shown in FIG. 3, the method includes the following steps.

Step 101: a network device generates measurement configuration information, where the measurement configuration information is used for indicating configuration information about a plurality of measurement gaps (MGs).

Step 102: the network device transmits the measurement configuration information to a terminal device.

Step 103: the terminal device performs a measurement according to the measurement configuration information.

Measurement gaps of the plurality of MGs indicated in the measurement configuration information in the embodiment of the present application can cover at least one SMTC of at least one measurement object (MO).

Figure 4A:
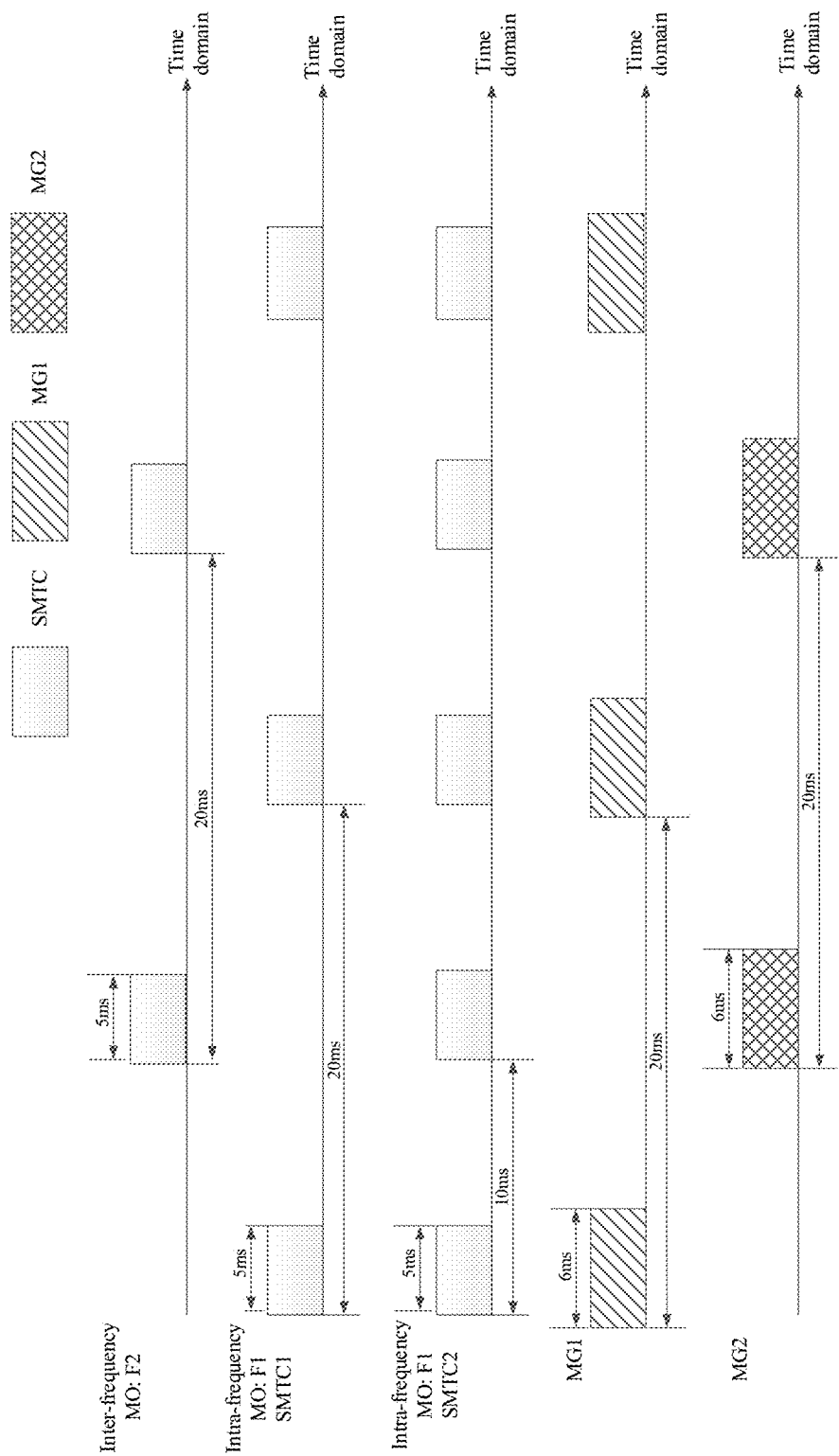
FIG. 4a is a schematic configuration diagram of two measurement gaps and SMTCs of different measurement objects provided by an embodiment of the present application.

In an example, the measurement gaps of the plurality of MGs may cover one SMTC of one intra-frequency MO, and the one STMC herein refers to a series of SMTC windows corresponding to the intra-frequency MO, such as an MO SMTC1 shown in FIG. 4a. In another example, the measurement gaps of the plurality of MGs may cover two SMTCs of one intra-frequency MO, for example, the plurality of MGs may cover SMTC1 and SMTC2 of the intra-frequency MO shown in FIG. 4a. In still another example, the measurement gaps of the plurality of MGs may cover a plurality of SMTCs of a plurality of MOs, and the plurality of MOs may be intra-frequency MOs and/or inter-frequency MOs, for example, the SMTC1 and the SMTC2 of the intra-frequency MO and SMTCs of the inter-frequency MO as shown in FIG. 4a.

It should be noted that, configuration of the plurality of MGs may not cover all SMTCs of at least one MO. However, compared with the prior art in which only one MG is configured, coverage of the MG can be improved, and the delay in measurement and reporting of the terminal can be reduced.

In a first possible design, the plurality of MGs configured by the network device may be the same type of MGs, for example, a first MG (namely, gapFR1) applicable to a first frequency range, a second MG (namely, gapFR2) applicable to a second frequency range, or a third MG (namely, gapUE) applicable to all frequency ranges.

In a second possible design, the plurality of MGs configured by the network device may be of at least two types of MGs. The at least two types of MGs may be any two of the first MG applicable to the first frequency range, the second MG applicable to the second frequency range, and the third MG applicable to all frequency band ranges, and may also be a fourth MG and any one or two of the first MG applicable to the first frequency range, the second MG applicable to the second frequency range, and the third MG applicable to all frequency band ranges.

It should be noted that the fourth MG is an MG of a newly added type, and is applicable to the same type of UEs, the same type of cells (i.e., per cell), and the same coverage area (i.e., per CG (cell group)). The same type of UEs may be understood as UEs with the same independent gap capability, for example, UEs operating at above 6 GHz. The same type of cells may be understood as cells operable in the same frequency layer, for example, the serving cell 16 and the neighbouring cell 17 as shown in FIG. 1. The same coverage area may be understood as all cells in the same coverage area, for example, an area where the terminal device 1 is located shown in FIG. 1 includes four cells, the serving cell 16 and the neighbouring cells 17 to 19, and the four cells belong to the same cell group (CG).

In the above second possible design, a new UE capability may be introduced to indicate that the UE may support MGs both per UE and per FR1/2. In other words, the network supports configuring the first MG applicable to the first frequency range and the third MG applicable to all frequency ranges at the same time, or configuring the second MG applicable to the second frequency range and the third MG applicable to all frequency ranges at the same time, or configuring the first MG applicable to the first frequency range and the second MG applicable to the second frequency range at the same time. The above design does not change an existing protocol framework, and two types of MGs can be configured at the same time, thereby improving flexibility of a network configuration.

As an example, FIG. 4a shows a schematic configuration diagram of two MGs and SMTCs of different MOs. As shown in FIG. 4a, the network configures two MGs, which are MG1 and MG2 respectively. The MG1 may cover all windows of SMTC1 of the intra-frequency MO and part of windows of SMTC2 of the intra-frequency MO, and the MG2 may cover part of windows of the SMTC2 of the intra-frequency MO and all windows of the inter-frequency MO. It can be seen that, as a supplement to the MG1, the MG2 can cover more SMTCs (for example, an SMTC window that cannot be covered by the MG1 in FIG. 4a). The types of the two MGs are not limited in this example, which may be the same type or different types.

In the above second possible design, a new UE capability may be introduced to indicate that the UE can additionally support one or more MGs (i.e., one or more MGs are configured on the basis of one MG) under a certain condition. The network supports a configuration of the plurality of MGs, where the plurality of MGs may be mutually independent, such as the MG1 and the MG2 as shown in FIG. 4a.

Figure 4B:
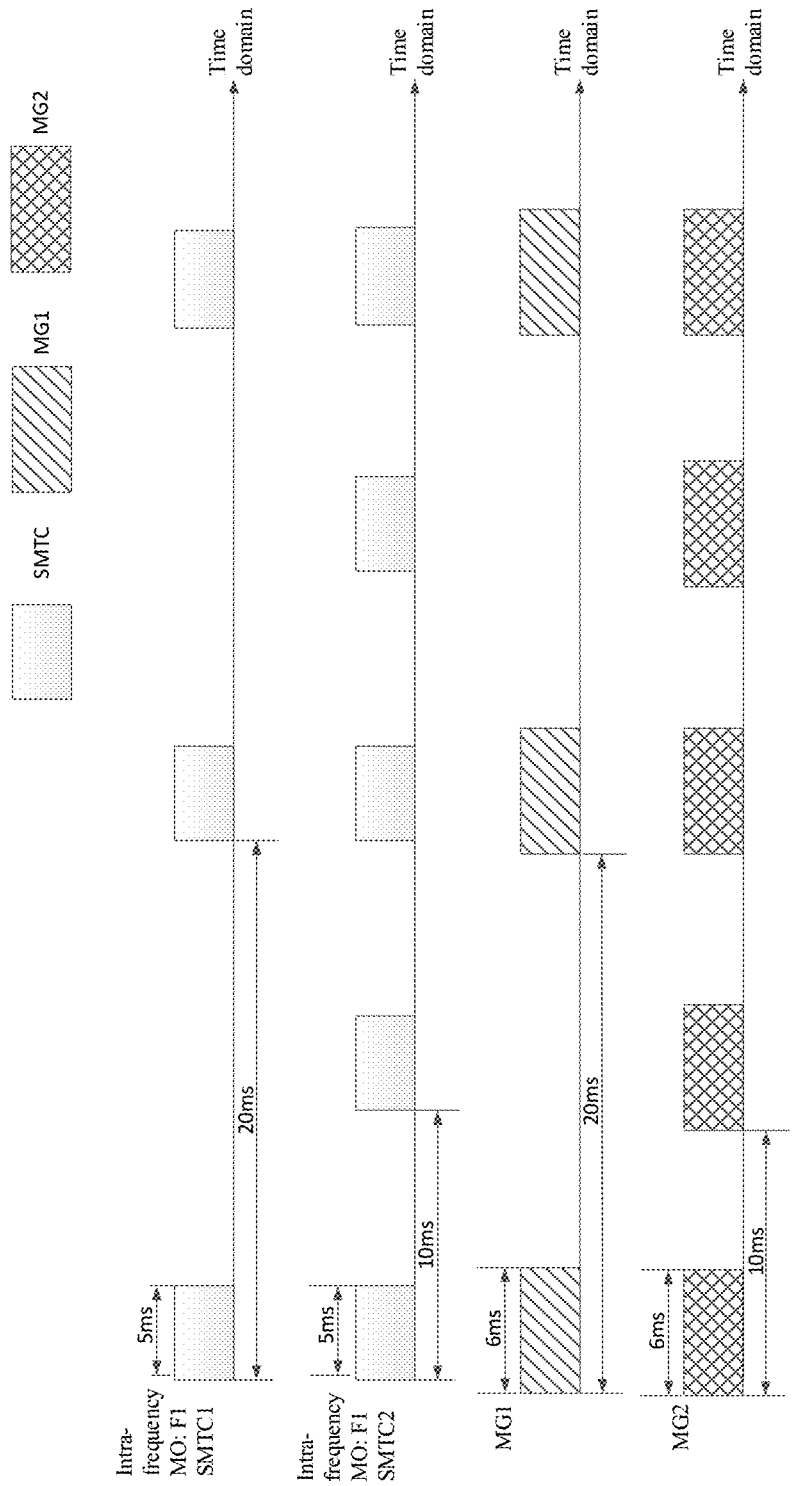
FIG. 4b is a schematic configuration diagram of two measurement gaps and SMTCs of different measurement objects provided by an embodiment of the present application.

The plurality of MGs may also be mutually associated, such as the MG1 and the MG2 as shown in FIG. 4b, periods of the MG1 and the MG2 are different, time offsets and lengths thereof are the same. Compared with the MG1, measurement windows of the MG2 are denser. The terminal device receives a measurement configuration of the plurality of MGs, and can neglect the MG1 and perform a measurement using the MG2.

In an embodiment, the plurality of MGs are the same type of MGs, and may be any type of an existing MG. The design does not change existing MG types and a conflict restriction between MG type configurations, and configures the plurality of MGs to cover the measurement of more MOs, thereby avoiding complexity and delay brought about by reconfiguration, and improving efficiency of mobility switching.

In an embodiment, at least one of time offsets, lengths, and periods of any two of the plurality of MGs are different. For details, reference may be made to Table 2. Table 2 shows several combinations of configuration parameters of any two of the plurality of MGs.

TABLE 2

| MG time offset | MG length | MG period |
| --- | --- | --- |
| ○ | X | X |
| ○ | X | ○ |
| ○ | ○ | X |
| X | ○ | ○ |
| X | ○ | X |
| X | X | ○ |
| X | X | X |

Note:
○ represents certain parameters of two MGs are the same, and X represents certain parameters of two MGs are different.

In an embodiment, a time offset of at least one of the plurality of MGs is equal to a time offset of an SMTC of a first MO.

In an embodiment, a length of at least one of the plurality of MGs is equal to a length of the SMTC of a first MO.

In an embodiment, a period of at least one of the plurality of MGs is equal to a period of the SMTC of a first MO.

The first MO is any one of the at least one MO, and may be an intra-frequency MO, an inter-frequency MO, or a heterogeneous MO.

As an example, an example is taken where the network configures two MGs, the network may configure that time offsets of the MG2 and the MG1 are the same, a period of the MG2 is not greater than a period of the MG1 so that the MG2 covers SMTCs other than the MG1; the network may configure the time offset of the MG2 to be different from that of the MG1, where the time offset of the MG2 is equal to that of an SMTC of a certain inter-frequency MO, so that the MG2 covers the SMTC of the inter-frequency MO. In an embodiment, the network may simultaneously configure a length of the MG2 to be less than a length of the MG1, so as to reduce the throughput loss of the terminal as much as possible while satisfying measurements of other MOs.

In the above second possible design, a new MG type may be introduced, that is, the foregoing fourth MG (a gap per cell or per CG). In other words, the network supports the configuration of the plurality of MGs, and on the basis of one existing MG, configures a dedicated MG (dedicated gap) for detecting a mobility measurement requirement of a certain type of UEs, a certain type of cells or a cell group in a certain coverage area.

As an example, the network device or the terminal device may configure the dedicated MG based on a triggering condition, where the triggering condition includes at least one of the following: the network device configuring the terminal device in performing early measurement reporting (early measurement), fast carrier setup (fast CA setup), dual connectivity (fast DC setup), or a temporary positioning measurement (positioning request). Certainly, the triggering condition may also include other urgent, high-priority measurement conditions, which is not limited in the embodiment of the present application. The network device satisfies measurements of other MOs by configuring the additional dedicated MG.

The above-mentioned design introduces the new MG type, and can realize a requirement for a mobility measurement on the same type of UEs, the same type of cells and the same area in batches, thereby preventing a network to perform configuration one by one, reducing signaling overheads of the network, reducing the delay in measurement and reporting of the terminal at the same time, and improving the efficiency of mobility switching.

In some embodiments, the network device can transmit the measurement configuration information to the terminal device through at least one of RRC signaling, downlink control information (DCI) and a system message.

As an example, the network device may configure the plurality of MGs through one of the RRC signaling, the DCI or the system message, for example, the network device may configure the MG1 and the MG2 shown in FIG. 4a or FIG. 4b through the RRC signaling.

As an example, the network device may configure the MG1 through the RRC signaling, and configure the MG2 through the DCI or the system message. It should be noted that the SMTCs are configured faster through the DCI than configured through the RRC signaling.

As an example, the plurality of MGs configured by the network device are different types of MGs, and the network device may configure one type of MGs through the RRC signaling, and configure another type of MGs through the DCI or the system message.

In some embodiments, the measurement performed by the terminal device according to the measurement configuration information includes one or more of an intra-frequency measurement, an inter-frequency measurement and an inter-RAT frequency measurement.

In the measurement configuration method provided by the embodiments of the present application, a network device generates measurement configuration information for indicating a plurality of MGs, and transmits the measurement configuration information to a terminal device. The terminal device performs a measurement based on the measurement configuration information. The plurality of MGs may be the same type of MGs or different types of MGs, and the measurement gaps of the plurality of MGs may cover at least one SMTC of at least one MO. By adding an MG configuration, a purpose of covering more SMTC windows can be achieved, and the delay problem in measurement and reporting of the terminal can be effectively reduced.

Figure 5:
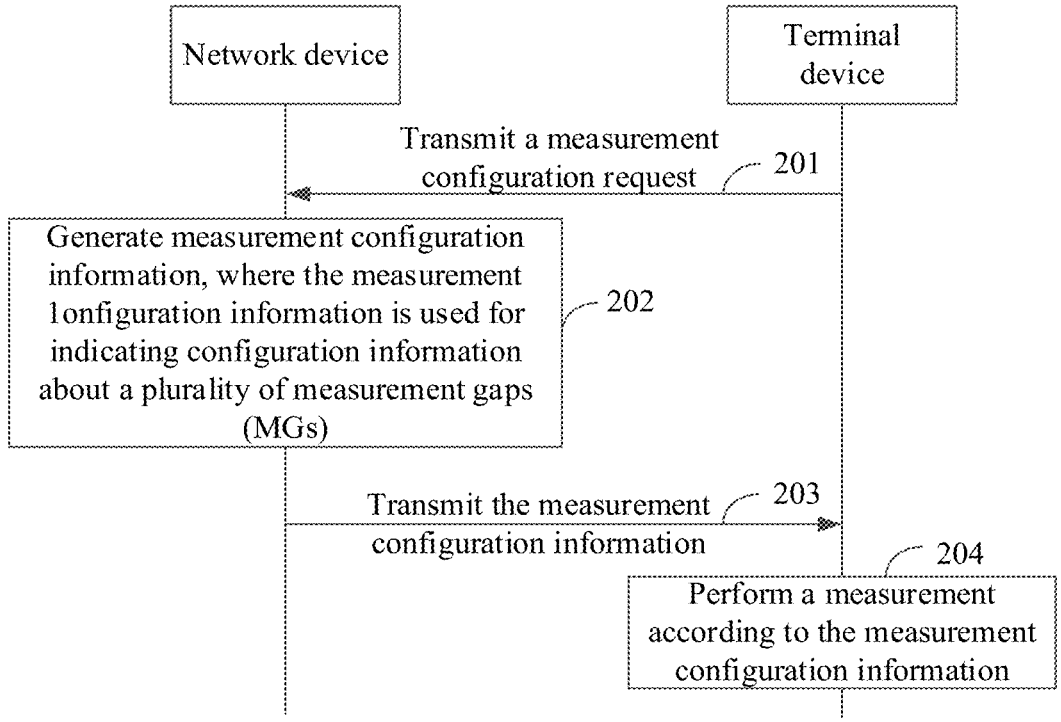
FIG. 5 is an interaction diagram of a measurement configuration method provided by an embodiment of the present application.

FIG. 5 is an interaction diagram of a measurement configuration method provided by an embodiment of the present application. On the basis of the embodiment shown in FIG. 3, as shown in FIG. 5, the measurement configuration method provided by the embodiment of the present application includes the following steps.

Step 201: a terminal device transmits a measurement configuration request to a network device.

In the embodiment of the present application, where the terminal device transmits the measurement configuration request to the network device specifically includes:

when a triggering condition is satisfied, the terminal device transmits the measurement configuration request to the network device;

where the triggering condition includes at least one of the following: the network device configuring the terminal device in performing early measurement reporting, fast carrier setup, dual connectivity, or a temporary positioning measurement.

Step 202: the network device generates measurement configuration information, where the measurement configuration information is used for indicating configuration information about a plurality of measurement gaps (MGs).

Step 203: the network device transmits the measurement configuration information to the terminal device.

Step 204: the terminal device performs a measurement according to the measurement configuration information.

Steps 202 to 204 in the embodiment of the present application are the same as steps 101 to 103 in the foregoing embodiment, and reference may be made to the foregoing embodiment for details, which are not described herein again.

The embodiment of the present application shows a measurement configuration triggered by the terminal device. The terminal device can transmit the measurement configuration request to the network device when a preset triggering condition is satisfied, so that the network device generates the configuration information about the plurality of MGs according to the measurement configuration request. The terminal device performs the measurement according to the measurement configuration of the plurality of MGs, thereby reducing the delay in measurement and reporting of the terminal, and improving flexibility of a measurement configuration of the network.

Based on any of the foregoing embodiments, in an embodiment, the network device may specify, through the RRC signaling or the system message, that a specific UE configures a dedicated MG in a certain cell list or in a certain cell group. The network device may also instruct all UEs to configure additional MGs under a condition which may be a measurement time window, a specific neighbouring cell, or a specific cell group (CG).

It can be seen from the above embodiments that the network device can pre-agree with the terminal device on the triggering condition of the measurement configuration, and the network device can configure the plurality of MGs for the terminal device based on its own determination or based on the measurement configuration request transmitted by the terminal device. The network device can introduce the new MG type based on a special measurement requirement of the network, thereby realizing a batch configuration for a type of UEs, a type of cells or an area, reducing signaling overheads of the network, and improving the efficiency of mobility switching.

In the foregoing embodiment, the plurality of MOs may be configured simultaneously or separately (namely, one or more MGs are additionally configured on the basis of an existing MG configuration). A second configuration manner is described in detail below with reference to FIG. 6.

Figure 6:
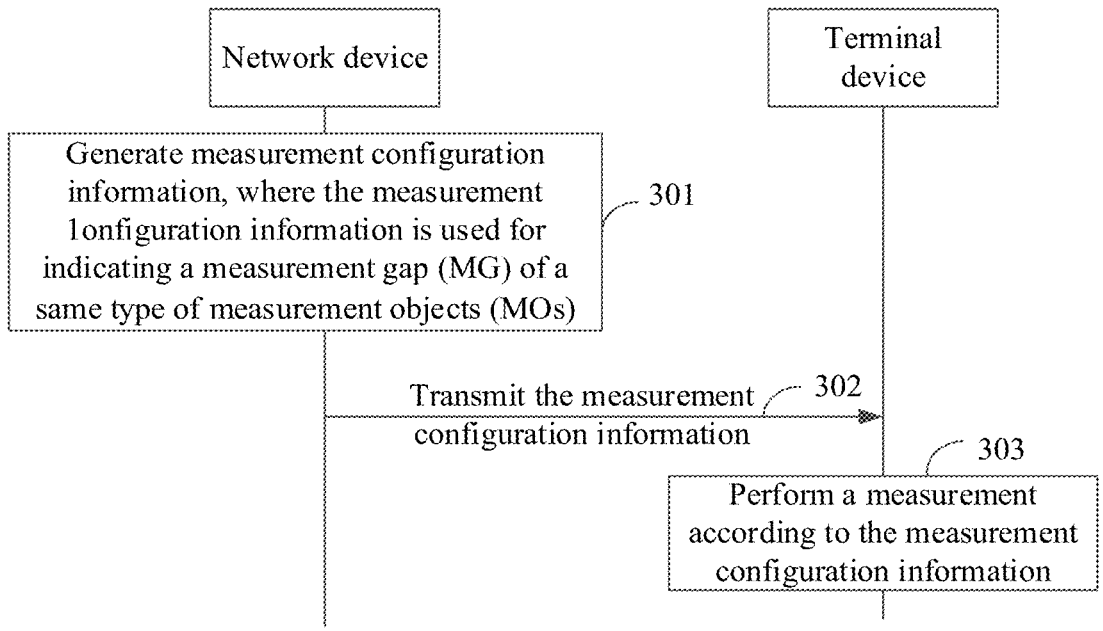
FIG. 6 is an interaction diagram of a measurement configuration method provided by an embodiment of the present application.

FIG. 6 is an interaction diagram of a measurement configuration method provided by an embodiment of the present application. As shown in FIG. 6, the measurement configuration method provided by the embodiment of the present application includes the following steps.

Step 301: a network device generates measurement configuration information, where the measurement configuration information is used for indicating a measurement gap (MG) of a same type of measurement objects (MOs).

In the embodiment of the present application, the MG of the same type of MOs is an MG additionally configured by the network device for the terminal device, which is different from a gap perUE or perFR1/FR2 in the existing mechanism, and the MG herein may be a gap per cell or per CG. MGs of the same type of MOs are applicable to the same type of UEs, the same type of cells, or the same coverage area. The network device may indicate the generated measurement configuration information to a specific UE or all UEs through RRC signaling or a system message.

In a possible design, the network device configures the gap perUE or perFR, but there is still an MO which cannot be measured, in this case, the network device may trigger an urgent and high-priority measurement based on a triggering condition, e.g., early measurement reporting, fast carrier setup, dual connectivity, or a temporary positioning measurement. The network device may also perform step 301 in the embodiment of the present application to configure an additional MG for the UE in a specific cell or in a specific cell group, to meet measurements of these MOs. The design is a measurement configuration directly triggered by the network device.

In another possible design, the network device may trigger the above measurement configuration based on a measurement configuration request transmitted by the terminal device. Specifically, when the triggering condition is satisfied, the terminal device transmits the measurement configuration request to the network device, where the measurement configuration request is used for instructing the network device to additionally configure an MG for the terminal device. The design is a measurement configuration triggered by the terminal device, and the network device additionally configures the MG based on a request of the terminal.

In an embodiment, a type of the additionally configured MG may also include an MG of an existing mechanism, for example, the network device has configured a gap perUE, and the additionally configured MG may be a gap perFR1 or perFR2.

Step 302: the network device transmits the measurement configuration information to the terminal device.

As an example, the network device may transmit the measurement configuration information to the terminal device through the RRC signaling or the system message.

Correspondingly, the terminal device acquires the measurement configuration information by receiving the RRC signaling or the system message transmitted from the network device and performs step 303.

Step 303: the terminal device performs a measurement according to the measurement configuration information.

In the measurement configuration method provided by the embodiments of the present application, a network device generates measurement configuration information for indicating an MG of the same type of MOs based on its determination or based on a measurement configuration request transmitted by a terminal device, where the MG of the same type of MOs is an MG additionally configured by the network device for the terminal device, the newly configured MG can cover more MO SMTCs, thus not only reducing the delay in measurement and reporting of the terminal, but also realizing a batch configuration of a mobility measurement requirement for the same type of UEs, the same type of cells and the same area, thereby reducing signaling overheads of a network.

The measurement configuration method provided in the embodiments of the present application is described in detail above, and the terminal device and the network device provided in the embodiments of the present application will be described below.

Figure 7:
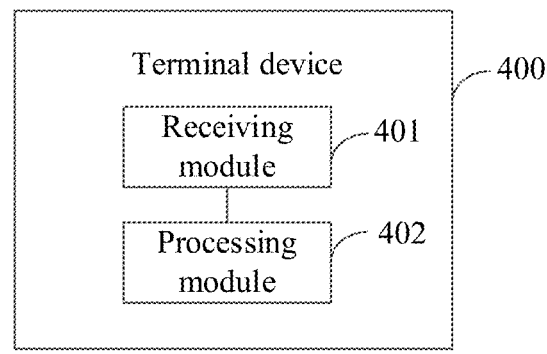
FIG. 7 is a schematic structural diagram of a terminal device provided by an embodiment of the present application.

FIG. 7 is a schematic structural diagram of a terminal device provided by an embodiment of the present application. As shown in FIG. 7, a terminal device 400 in the embodiment of the present application, including:

a receiving module 401, configured to receive measurement configuration information from a network device, where the measurement configuration information is used for indicating configuration information about a plurality of measurement gaps (MGs); and a processing module 402, configured to perform a measurement according to the measurement configuration information.

In some embodiments, measurement gaps of the plurality of MGs cover at least one synchronization signal block measurement timing configuration (SMTC) information of at least one measurement object (MO).

In some embodiments, the plurality of MGs include at least two types of MGs.

In some embodiments, the at least two types of MGs include any two of a first MG applicable to a first frequency range, a second MG applicable to a second frequency range, and a third MG applicable to all frequency band ranges.

In some embodiments, the plurality of MGs are a same type of MGs.

In some embodiments, at least one of time offsets, lengths, and periods of any two of the plurality of MGs are different.

In an embodiment, a time offset of at least one of the plurality of MGs is equal to a time offset of an SMTC of a first MO, and the first MO is any one of the at least one MO.

In an embodiment, a length of at least one of the plurality of MGs is equal to a length of an SMTC of a first MO, and the first MO is any one of the at least one MO.

In an embodiment, a period of at least one of the plurality of MGs is equal to a period of an SMTC of a first MO, and the first MO is any one of the at least one MO.

In some embodiments, the at least two types of MGs include:

a fourth MG and any one or two of a first MG applicable to a first frequency range, a second MG applicable to a second frequency range, a third MG applicable to all frequency band ranges.

The fourth MG is applicable to a same type of UEs, a same type of cells or a same coverage area.

In a possible design, the receiving module 401 is specifically configured to:

acquire the measurement configuration information through receiving at least one of RRC signaling, downlink control information (DCI), and a system message transmitted from the network device.

The terminal device provided by the embodiment of the present application is used for executing the technical solution of the terminal device in the method embodiment shown in FIG. 3. The implementation principle and technical effects are similar, and are not described herein again.

Figure 8:
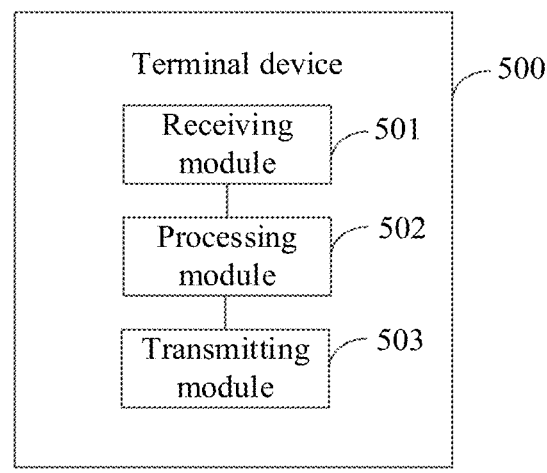
FIG. 8 is a schematic structural diagram of a terminal device provided by an embodiment of the present application.

FIG. 8 is a schematic structural diagram of a terminal device provided by an embodiment of the present application. As shown in FIG. 8, a terminal device 500 in the embodiment of the present application, including:

a receiving module 501, configured to receive measurement configuration information from a network device, where the measurement configuration information is used for indicating a measurement gap (MG) of a same type of measurement objects (MOs), and the MG of the same type of MOs is an MG additionally configured by the network device for the terminal device; and a processing module 502, configured to perform a measurement according to the measurement configuration information.

In an embodiment, the MG of the same type of MOs is applicable to a same type of UEs, a same type of cells or a same coverage area.

In an embodiment, the terminal device 500 further includes:

a transmitting module 503, and the transmitting module 503 is configured to transmit a measurement configuration request to the network device before the receiving module 501 receives the measurement configuration information from the network device, where the measurement configuration request is used for instructing the network device to additionally configure an MG for the terminal device.

In a possible design, the transmitting module 503 is specifically configured to:

when a triggering condition is satisfied, transmit the measurement configuration request to the network device;

where the triggering condition includes at least one of the following: the network device configuring the terminal device in performing early measurement reporting, fast carrier setup, dual connectivity, or a temporary positioning measurement.

In an embodiment, the receiving module 501 is specifically configured to:

acquire the measurement configuration information through receiving RRC signaling or a system message transmitted from the network device.

The terminal device provided by the embodiment of the present application is used for executing the technical solution of the terminal device in the method embodiment shown in FIG. 5 or FIG. 6. The implementation principle and technical effects are similar, and are not described herein again.

Figure 9:
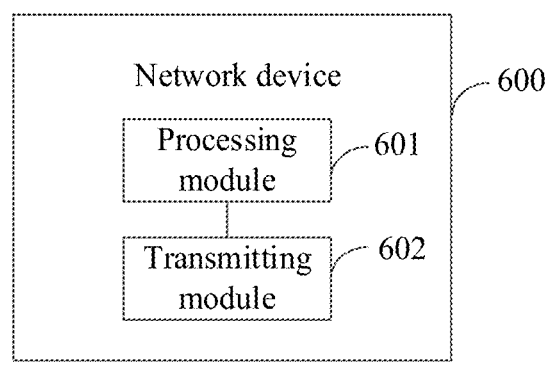
FIG. 9 is a schematic structural diagram of a network device provided by an embodiment of the present application.

FIG. 9 is a schematic structural diagram of a network device provided by an embodiment of the present application. As shown in FIG. 9, a network device 600 in the embodiment of the present application, including:

a processing module 601, configured to generate measurement configuration information, where the measurement configuration information is used for indicating configuration information about a plurality of measurement gaps (MGs); and a transmitting module 602, configured to transmit the measurement configuration information to a terminal device.

In some embodiments, measurement gaps of the plurality of MGs cover at least one synchronization signal block measurement timing configuration (SMTC) information of at least one measurement object (MO).

In some embodiments, the plurality of MGs include at least two types of MGs.

In some embodiments the at least two types of MGs include any two of a first MG applicable to a first frequency range, a second MG applicable to a second frequency range, and a third MG applicable to all frequency band ranges.

In some embodiments, the plurality of MGs are a same type of MGs.

In some embodiments, at least one of time offsets, lengths, and periods of any two of the plurality of MGs are different.

In an embodiment, a time offset of at least one of the plurality of MGs is equal to a time offset of an SMTC of a first MO, and the first MO is any one of the at least one MO.

In an embodiment, a length of at least one of the plurality of MGs is equal to a length of an SMTC of a first MO, and the first MO is any one of the at least one MO.

In an embodiment, a period of at least one of the plurality of MGs is equal to a period of an SMTC of a first MO, and the first MO is any one of the at least one MO.

In some embodiments, the at least two types of MGs include:
- a fourth MG and any one or two of a first MG applicable to a first frequency range, a second MG applicable to a second frequency range, a third MG applicable to all frequency band ranges.

The fourth MG is applicable to a same type of UEs, a same type of cells or a same coverage area.

In a possible design, the transmitting module 602 is specifically configured to:
- transmit the measurement configuration information to the terminal device through at least one of RRC signaling, downlink control information (DCI), and a system message.

The network device provided by the embodiment of the present application is used for executing the technical solution of the network device in the method embodiment shown in FIG. 3. The implementation principle and technical effects are similar, and are not described herein again.

Figure 10:
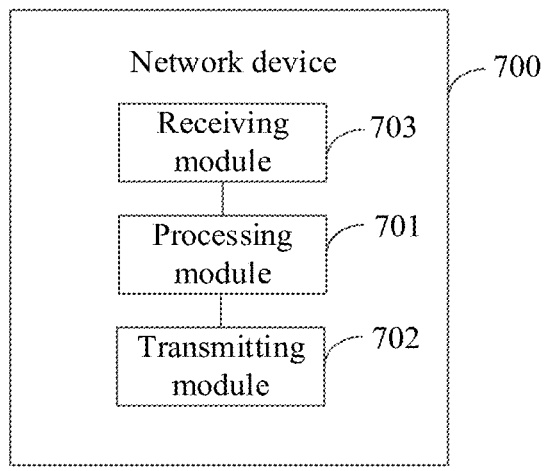
FIG. 10 is a schematic structural diagram of a network device provided by an embodiment of the present application.

FIG. 10 is a schematic structural diagram of a network device provided by an embodiment of the present application. As shown in FIG. 10, a network device 700 in the embodiment of the present application, including
- a processing module 701, configured to generate measurement configuration information, where the measurement configuration information is used for indicating a measurement gap (MG) of a same type of measurement objects (MOs), and the MG of the MOs of the same type is an MG additionally configured by the network device for a terminal device; and
- a transmitting module 702, configured to transmit the measurement configuration information to the terminal device.

In an embodiment, the MG of the same type of MOs is applicable to a same type of UEs, a same type of cells or a same coverage area.

In an embodiment, the network device further includes a receiving module 703, and the receiving module 703 is configured to:
- receive a measurement configuration request from the terminal device before the processing module 701 generates the measurement configuration information, where the measurement configuration request is used for instructing the network device to additionally configure an MG for the terminal device.

In a possible design, the processing module 701 is specifically configured to:
- when a triggering condition is satisfied, generate the measurement configuration;
- where the triggering condition includes at least one of the following: the network device configuring the terminal device in performing early measurement reporting, fast carrier setup, dual connectivity, or a temporary positioning measurement.

In a possible design, the transmitting module 702 is specifically configured to:
- transmit the measurement configuration information to the terminal device through RRC signaling or a system message.

The network device provided by the embodiment of the present application is used for executing the technical solution of the network device in the method embodiment shown in FIG. 5 or FIG. 6. The implementation principle and technical effects are similar, and are not described herein again.

It should be noted that, it should be understood that a division of each module of the foregoing terminal device or network device is merely a division of logical functions, and in an actual implementation, they may be wholly or partially integrated into a physical entity, and may also be physically separated. Furthermore, these modules may be all implemented in a form of software invoked by a processing element, may also be all implemented in a form of hardware, and may also be implemented in a form of a part of the modules being implemented in the form of software invoked by the processing element, and a part of the modules being implemented in the form of hardware. For example, a processing module may be a separately established processing element, and may also be integrated in a chip of the above apparatus for implementation. In addition, the processing module may also be stored in a memory of the above apparatus in a form of program codes, and is invoked by the processing element of the above apparatus and executes functions of the foregoing determining modules. Other modules can be implemented in a similar manner. In addition, all or some of the modules can be integrated together, or can be implemented separately. The processing element herein may be an integrated circuit, and has a signal processing capability. During the implementation, each step or each module of the foregoing method may be completed by an integrated logic circuit of hardware in a processor element or instructions in a software form.

For example, the above modules may be one or more integrated circuits configured to implement the above method, for example, one or more application specific integrated circuits (application specific integrated circuit, ASIC), or one or more digital signal processors (digital signal processor, DSP), or one or more field programmable gate arrays (field programmable gate array, FPGA), etc. Also, when a module is implemented in the form of program codes being scheduled by the processing element, the processing element may be a general processor, for example, a central processing unit (CPU) or other processors capable of invoking the program codes. Also, these modules may be integrated together and implemented in a form of a system-on-a-chip (SOC).

The above described embodiments may be implemented in whole or in part by software, hardware, firmware, or any combination thereof, and may be implemented in whole or in part in the form of a computer program product when implemented using the software. The computer program product includes one or more computer instructions. When computer program instructions are loaded and executed on a computer, a procedure or a function according to the embodiments of the present application is totally or partially generated. The computer may be a general purpose computer, a special purpose computer, a computer network, or other programmable apparatus. The computer instructions may be stored in a computer readable storage medium or transmitted from one computer readable storage medium to another. For example, the computer instructions may be transmitted from one website, one computer, one server, or one data center to another web site, another computer, another server, or another data center in a wired manner (e.g., a coaxial cable, a fiber, a digital subscriber line (DSL)), or in a wireless manner (e.g., infrared, wireless, microwave, etc.). The computer readable storage medium may be any available medium that can be accessed by a computer or a data storage device that includes one or more available media such as a server, a data center, or the like. The available medium may be a magnetic medium, (e.g., a floppy disk, a hard disk, a magnetic tape), an optical medium (e.g., DVD), or a semiconductor medium (e.g., a solid state disk (SSD)), etc.

Figure 11:
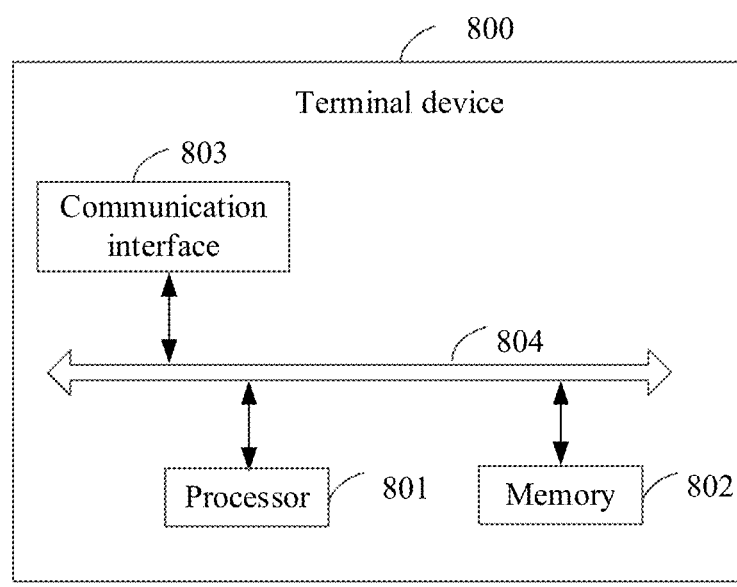
FIG. 11 is a hardware schematic structural diagram of a terminal device provided by an embodiment of the present application.

FIG. 11 is a schematic structural diagram of hardware of a terminal device provided by an embodiment of the present application. As shown in FIG. 11, a terminal device 800 according to an embodiment of the present application may include: a processor 801, a memory 802, and a communication interface 803.

The memory 802 is configured to store a computer program; and the processor 801 is configured to execute the computer program stored in the memory 802, so as to implement the method executed by the terminal device in the foregoing embodiments. The communication interface 803 is configured to perform data communication or signal communication with a functional network element.

In an embodiment, the memory 802 may be independent of or integrated with the processor 801. When the memory 802 is a component independent of the processor 801, the terminal device 800 can further include a bus 804, configured to connect the memory 802 and the processor 801.

In a possible implementation, the processing module 402 in FIG. 7 may be integrated into the processor 801 and the receiving module 401 may be integrated into the communication interface 803 for implementation. The processing module 502 in FIG. 8 may be integrated into the processor 801 for implementation, and the receiving module 501 and the transmitting module 503 may be integrated into the communication interface 803 for implementation.

In a possible implementation, the processor 801 may be configured to implement a signal processing operation of the terminal device in the foregoing method embodiments, and the communication interface 803 may be configured to implement a signal transceiving operation of the terminal device in the foregoing method embodiments.

The terminal device provided in this embodiment may be configured to execute the method executed by the terminal device in any one of the foregoing method embodiments, and implementation principles and technical effects thereof are similar, which are not described herein again.

Figure 12:
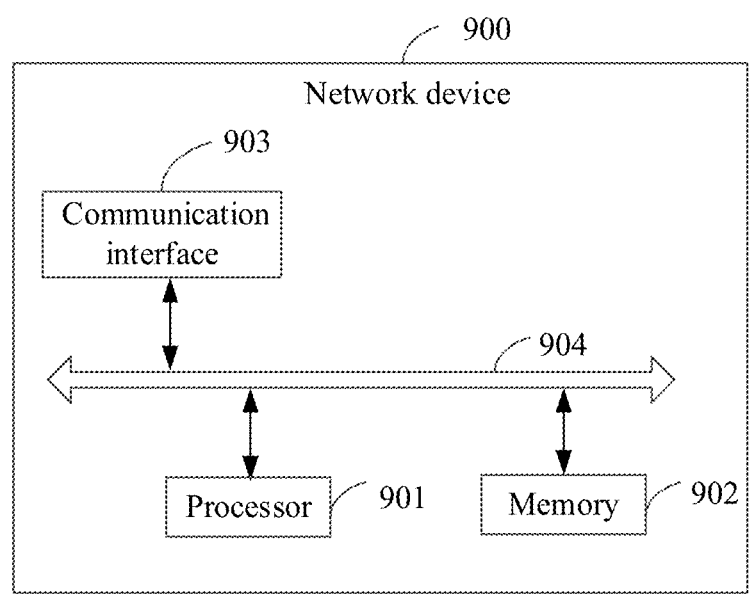
FIG. 12 is a hardware schematic structural diagram of a network device provided by an embodiment of the present application.

FIG. 12 is a schematic diagram of a hardware structure of a network device provided by an embodiment of the present application. As shown in FIG. 12, a network device 900 according to an embodiment of the present application includes: a processor 901, a memory 902, and a communication interface 903.

The memory 902 is configured to store a computer program; and the processor 901 is configured to execute the computer program stored in the memory 902, so as to implement the method executed by the network device in the foregoing embodiments. The communication interface 903 is configured to perform data communication or signal communication with the terminal device or other functional network elements.

In an embodiment, the memory 902 may be independent of or integrated with the processor 901. When the memory 902 is a component independent of the processor 901, the network device 900 can further include a bus 904 configured to connect the memory 902 and the processor 901.

In a possible implementation, the processing module 601 in FIG. 9 may be integrated into the processor 901, and the transmitting module 602 may be integrated into the communication interface 903 for implementation. The processing module 701 in FIG. 10 may be integrated into the processor 901 and the transmitting module 702 and the receiving module 703 may be integrated into the communication interface 903 for implementation.

In a possible implementation, the processor 901 may be configured to implement a signal processing operation of the network device in the foregoing method embodiments, and the communication interface 903 may be configured to implement a signal transceiving operation of the network device in the foregoing method embodiments.

The network device provided in this embodiment may be configured to execute the method executed by the network device in any one of the foregoing method embodiments, and implementation principles and technical effects thereof are similar, and are not repeatedly described herein.

Embodiments of the present application provide a computer readable storage medium. The computer readable storage medium stores computer execution instructions. When being executed by a processor, the computer execution instructions are used for implementing a technical solution of a terminal device in any one of the foregoing method embodiments.

Embodiments of the present application provide a computer readable storage medium. The computer readable storage medium stores computer execution instructions. When being executed by a processor, the computer execution instructions are used for implementing a technical solution of a network device in any one of the foregoing method embodiments.

Embodiments of the present application provide a program. When being executed by a processor, the program is used for executing the technical solution of the terminal device in any one of the foregoing method embodiments.

Embodiments of the present application provide a program. When being executed by a processor, the program is used for executing the technical solution of the network device in any one of the foregoing method embodiments.

Embodiments of the present application provide a computer program product, including program instructions. The program instructions are used for implementing the technical solution of the terminal device in any one of the foregoing method embodiments.

Embodiments of the present application provide a computer program product, including program instructions. The program instructions are used for implementing the technical solution of the network device in any one of the foregoing method embodiments.

Embodiments of the present application provide a chip, including: a processing module and a communication interface, where the processing module can execute the technical solution of the terminal device in the foregoing method embodiments. Further, the chip also includes a storage module (e.g., a memory), where the storage module is used for storing instructions, and the processing module is used for executing the instructions stored in the storage module, and executing the instructions stored in the storage module, so that the processing module is caused to execute the technical solution of the terminal device.

Embodiments of the present application further provide a chip, including: a processing module and a communication interface, where the processing module can execute the technical solution of the network device in the foregoing method embodiment. Further, the chip also includes a storage module (e.g., a memory), where the storage module is used for storing instructions, and the processing module is used for executing the instructions stored in the storage module, and executing the instructions stored in the storage module, so that the processing module is caused to execute the technical solution of the network device.

In the present application, an expression of "at least two" refers to two or more, and an expression of "a plurality of" refers to two or more. An expression of "and/or" describes an association relationship between associated objects, and represents that there may exist three relationships. For example, A and/or B may represent a case where A exists separately, A and B exist simultaneously, and B exists separately, where A and B may be singular or plural. The character of "/" generally indicates an "or" relationship between the associated objects; while in a formula, the character "/" indicates a "divided" relationship between the associated objects. An expression of "at least one of" or the like, refers to any combination of these items, including any combination of singular item(s) or plural item(s). For example, at least one of a, b, or c may represent a, b, c, a-b, a-c, b-c, or a-b-c, where a, b, and c may be single or multiple.

It should be understood that various digit numbers involved in the embodiments of the present application are only used for convenience of description and differentiation, and are not used to limit the scope of the embodiments of the present application.

It should be understood that, in the embodiments of the present application, sequence numbers of the foregoing processes do not imply an execution sequence, and the execution sequence of the processes should be determined according to functions and internal logics thereof, which should not constitute any limitation to an implementation process of the embodiments of the present application.

What is claimed is:

1. A measurement configuration method, comprising:
   generating, by a network device, measurement configuration information, wherein the measurement configuration information is used for indicating configuration information about a plurality of measurement gaps (MGs); and
   transmitting, by the network device, the measurement configuration information to a terminal device;
   wherein measurement gaps of the plurality of MGs cover at least one synchronization signal block measurement timing configuration (SMTC) information of at least one measurement object (MO).

2. The method according to claim 1, wherein the plurality of MGs comprise at least two types of MGs.

3. The method according to claim 2, wherein the at least two types of MGs comprise any two of a first MG applicable to a first frequency range, a second MG applicable to a second frequency range, and a third MG applicable to all frequency band ranges.

4. The method according to claim 1, wherein the plurality of MGs are a same type of MGs.

5. The method according to claim 4, wherein at least one of time offsets, lengths, and periods of any two of the plurality of MGs are different.

6. A terminal device, comprising a memory, a processor and a communication interface, wherein the memory is configured to store a computer program, and the processor is configured to invoke and run the computer program stored in the memory to:
   control the communication interface to receive measurement configuration information from a network device, wherein the measurement configuration information is used for indicating configuration information about a plurality of measurement gaps (MGs); and
   perform a measurement according to the measurement configuration information;
   wherein measurement gaps of the plurality of MGs cover at least one synchronization signal block measurement timing configuration (SMTC) information of at least one measurement object (MO).

7. The terminal device according to claim 6, wherein the plurality of MGs comprise at least two types of MGs.

8. The terminal device according to claim 7, wherein the at least two types of MGs comprise any two of a first MG applicable to a first frequency range, a second MG applicable to a second frequency range, and a third MG applicable to all frequency band ranges.

9. The terminal device according to claim 6, wherein the plurality of MGs are a same type of MGs.

10. The terminal device according to claim 9, wherein at least one of time offsets, lengths, and periods of any two of the plurality of MGs are different.

11. The terminal device according to claim 9, wherein a time offset of at least one of the plurality of MGs is equal to a time offset of an SMTC of a first MO, and the first MO is any one of the at least one MO.

12. A network device, comprising a memory, a processor and a communication interface, wherein the memory is configured to store a computer program, and the processor is configured to invoke and run the computer program stored in the memory to:
   generate measurement configuration information, wherein the measurement configuration information is used for indicating configuration information about a plurality of measurement gaps (MGs); and
   control the communication interface to transmit the measurement configuration information to a terminal device;
   wherein measurement gaps of the plurality of MGs cover at least one synchronization signal block measurement timing configuration (SMTC) information of at least one measurement object (MO).

13. The network device according to claim 12, wherein the plurality of MGs comprise at least two types of MGs.

14. The network device according to claim 13, wherein the at least two types of MGs comprise any two of a first MG applicable to a first frequency range, a second MG applicable to a second frequency range, and a third MG applicable to all frequency band ranges.

15. The network device according to claim 12, wherein the plurality of MGs are a same type of MGs.

16. The network device according to claim 15, wherein at least one of time offsets, lengths, and periods of any two of the plurality of MGs are different.

17. The network device according to claim 15, wherein a length of at least one of the plurality of MGs is equal to a length of an SMTC of a first MO, and the first MO is any one of the at least one MO.

* * * * *